United States Patent
Tokuyasu et al.

(10) Patent No.: US 6,484,690 B2
(45) Date of Patent: Nov. 26, 2002

(54) CONTROL EQUIPMENT FOR INTERNAL COMBUSTION ENGINES

(75) Inventors: Noboru Tokuyasu, Hitachi (JP);
Toshiharu Nogi, Hitachinaka (JP);
Takuya Shiraishi, Hitachinaka (JP);
Yoko Nakayama, Hitachi (JP);
Yoshihiro Sukegawa, Hitachi (JP);
Yusuke Kihara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/793,429

(22) Filed: Feb. 27, 2001

(65) Prior Publication Data

US 2001/0022169 A1 Sep. 20, 2001

Related U.S. Application Data

(63) Continuation-in-part of application No. 09/478,440, filed on Jan. 6, 2000, now Pat. No. 6,199,534.

(30) Foreign Application Priority Data

Jan. 6, 1999 (JP) .............................. 11-001186

(51) Int. Cl.$^7$ ................................................. F02B 3/00
(52) U.S. Cl. ........................................ 123/301; 123/306
(58) Field of Search ............................... 123/301, 305, 123/306, 308, 302, 295, 430

(56) References Cited

U.S. PATENT DOCUMENTS

| | | | | |
|---|---|---|---|---|
| 5,765,372 A | * | 6/1998 | Mitobe et al. | 60/301 |
| 5,850,816 A | * | 12/1998 | Ohsuga et al. | 123/430 |
| 6,109,236 A | * | 8/2000 | Takahashi et al. | 123/339.19 |
| 6,135,085 A | * | 10/2000 | Toyohara et al. | 123/306 |
| 6,334,427 B1 | * | 1/2002 | Nakayama et al. | 123/305 |

* cited by examiner

Primary Examiner—Willis R. Wolfe
Assistant Examiner—Mahmoud Gimie
(74) Attorney, Agent, or Firm—Crowell & Moring LLP

(57) ABSTRACT

The piston 4 is one whose top part has a flat shape. Fuel is injected directly inside the cylinder 1 from the fuel injection valve 2. The tumble air flow control valve 7 adjusts the strength of the tumble air flow. The injected fuel pressure control section 110 of the control unit 100 varies the injected fuel pressure in accordance with the rotational speed of the engine while maintaining constant the opening angle of the tumble air flow adjustment valve 7. The TCV opening angle control section 120 varies the opening angle of the tumble air flow adjustment valve 7 in accordance with the rotational speed of the engine while maintaining constant the injected fuel pressure. The control is made by switching between the injected fuel pressure control section 110 and the TCV opening angle control section 120 depending on the rotational speed of the engine.

5 Claims, 11 Drawing Sheets

ENERGY OF AIR Ea

ENERGY OF FUEL SPRAY Ef

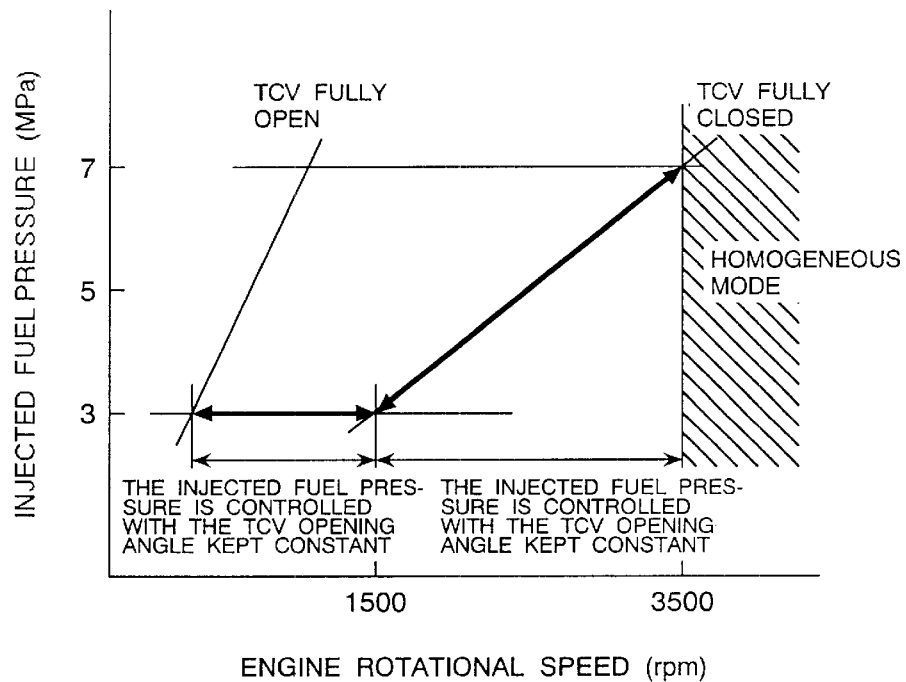
FIG. 17
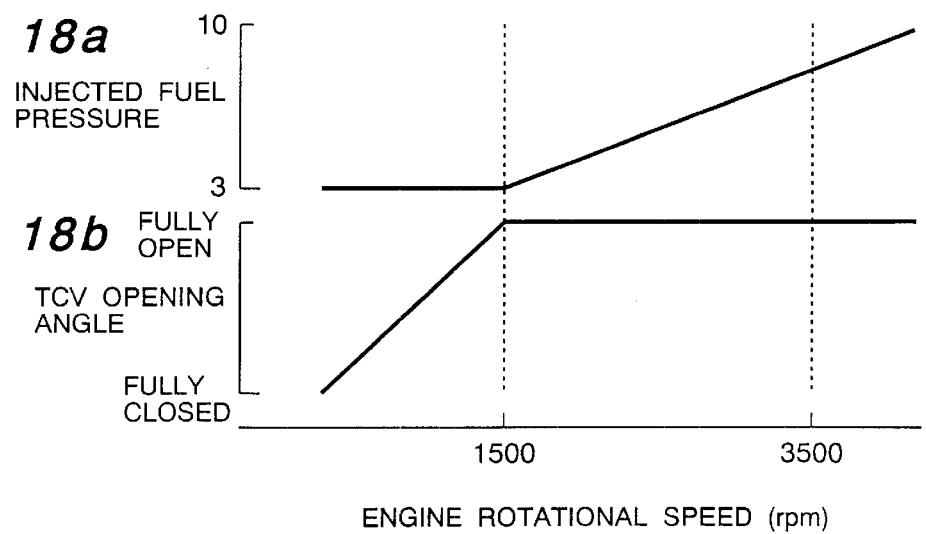
FIG. 18a
FIG. 18b

CONTROL EQUIPMENT FOR INTERNAL COMBUSTION ENGINES

This is a Continuation-in-part of application Ser. No. 09/478,440, filed Jan. 6, 2000, now U.S. Pat. No. 6,199,534.

BACKGROUND OF THE INVENTION

The present invention relates to control equipment for internal combustion engines, and more particularly to control equipment for internal combustion engines ideally suitable for application to fuel injection engines in which the fuel is injected directly into the cylinder.

In the conventional fuel injection engines in which the fuel is injected directly into the cylinder, as for example described in Japanese Laid-open Patent Publication No. Hei 10-205338, a cavity is provided in the top part of the piston, thereby transporting the fuel spray injected from the fuel injector valve to the neighborhood of the spark plug.

SUMMARY OF THE INVENTION

However, since the depth of the cavity formed in the top part of the piston is about 15 mm, there is the problem that the amount of HC in the exhaust gas increases because the fuel sprayed into the cavity gets adhered to the wall surface of the cavity.

In view of this, the present inventors have been investigating a fuel injection internal combustion engine which uses a piston whose top part is either a flat surface or has some shallow grooves several millimeters in depth thereby preventing the adhesion of fuel spray on the piston surface, and the role of the cavity is made to be performed by the flow of the air sucked in, that is, the fuel spray is transported to the neighborhood of the spark plug by air flow (tumble) in the vertical direction. However, in the fuel injection internal combustion engine with such a construction, there was the problem that there may be some situations in which it is not possible to form a combustible air-fuel mixture in the neighborhood of the spark plug at the time of ignition and consequently the combustion becomes unstable.

The purpose of the present invention is to offer a control equipment for internal combustion engines used in fuel injection engines that have the features of not only a cleaner exhaust gas but also of stable combustion.

(1) In order to achieve the above object, according to the present invention, in the control equipment for internal combustion engines in which fuel is injected directly into the cylinder and an air motion control valve is provided in the air suction manifold for adjusting the strength of tumble air motion, the control equipment is provided with a control means that controls the angle of opening of said air motion control valve and the pressure of said injected fuel in accordance with the rotational speed of the engine.

In an internal combustion engine with this configuration, it becomes possible to form a combustible air-fuel mixture in the neighborhood of the spark plug at the time of ignition, and consequently, it is not only possible to make the exhaust gas cleaner but also to obtain stable combustion.

(2) In the above item (1), the piston placed inside said cylinder preferably is one with a flat-shaped top part.

(3) In the above item (1), it is preferable that said control means is provided with a fuel pressure control section that adjusts the pressure of said injected fuel according to the rotational speed of the engine while maintaining constant the angle of opening of said air motion control valve, and a TCV opening angle control section that adjusts the angle of opening of said air motion control valve according to the rotational speed of the engine while maintaining constant the pressure of said injected fuel (fuel pressure), and the control is carried out by switching between said fuel pressure control section and TCV opening angle control section depending on the rotational speed of the engine.

BRIEF DESCRIPTION OF DRAWINGS

FIG. 17 is a diagram explaining the operation of the control unit constituting the control equipment for internal combustion engines according to the third preferred embodiment of this invention;

FIGS. 18a–b is a diagram explaining the operation of the control unit constituting the control equipment for internal combustion engines according to the third preferred embodiment of this invention.

DETAILED DESCRIPTION OF THE PREFERRED EMBODIMENTS

The configuration of the control equipment for internal combustion engines is described below by means of a preferred embodiment of the present invention using FIGS. 1 to 14.

Firstly, the overall configuration of a fuel injection system using a control equipment for internal combustion engines is described below for the present preferred embodiment of the invention using FIG. 1.

Figure 1:
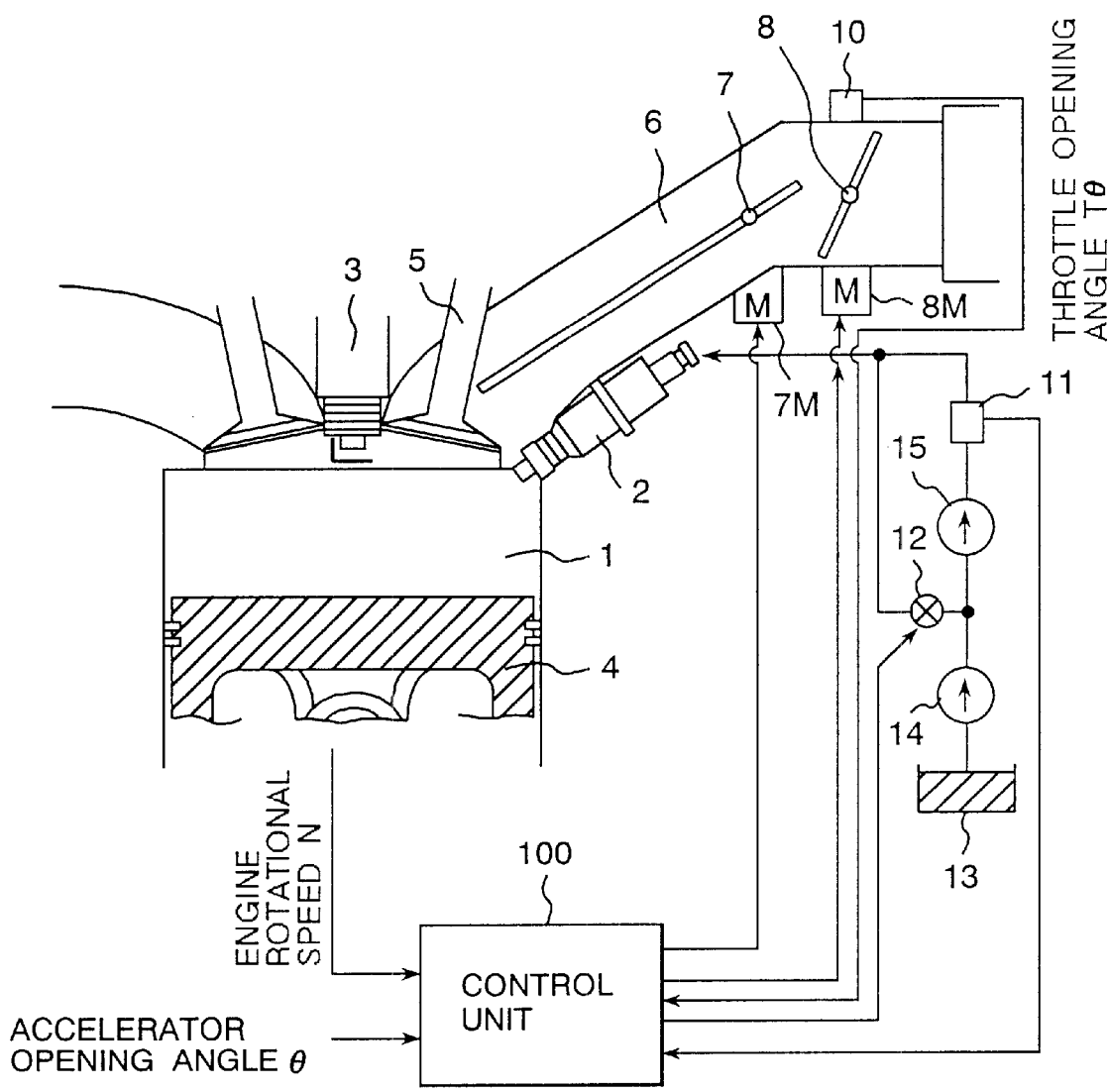
FIG. 1 a system configuration diagram showing the overall configuration of the fuel injection system using the control equipment for internal combustion engines according to one preferred embodiment of this invention.

FIG. 1 shows the overall configuration diagram of a control equipment for internal combustion engines of a preferred embodiment of the present invention.

The engine consists of a fuel injection valve 2 that directly injects fuel into the combustion chamber 1, a spark plug 3 provided at the center of the combustion chamber, a flat piston 4 whose top part is flat, an air suction valve 5, an air suction pipe 6, an air motion control valve 7 (hereinafter referred to as TVC) provided inside the air suction pipe for forming a tumbling air flow, and a throttle valve provided in the air suction pipe 6 on the inlet side of TCV 7. Further, the piston 4 is a flat shaped piston whose top part either has a flat shape or has some grooves that are several millimeters deep.

The crank angle signal indicating the engine rotational speed N, the throttle sensor signal indicating the throttle opening angle T that is detected by the throttle sensor 10, the accelerator opening angle signal indicating the accelerator opening angle that is the amount of depression of the accelerator pedal, and the injected fuel pressure signal detected by the injected fuel pressure sensor 11, etc., are input to the control unit 100 that controls the engine, and also, the TCV control signal that drives the motor 7M that changes the opening angle of TCV 7, the throttle valve control signal that drives the motor 8M that changes the opening angle of the throttle valve 8, and the control signal for the injected fuel pressure adjustment valve 12 are output by this control unit 100.

The fuel is fed from the fuel tank 13 by the low pressure fuel pump 14 and the high pressure fuel pump 15, and is supplied to the fuel injection valve 2. The supplied, injected fuel pressure is determined by the injected fuel pressure adjustment valve 12.

Next, the conditions inside the cylinder during the combustion process at the time of fuel injection in the compression stroke are described using FIG. 2.

FIG. 2 is a diagram explaining the conditions inside the cylinder during the combustion process at the time of fuel injection in the compression stroke.

Figure 2A:
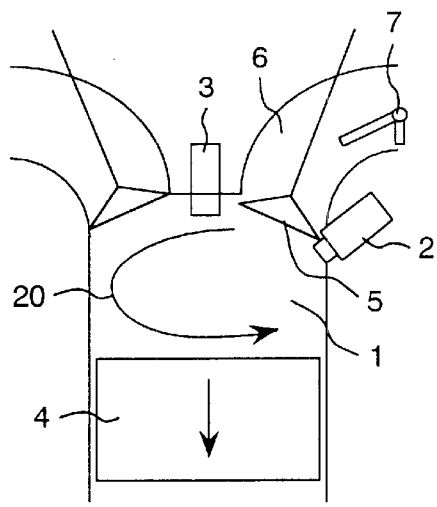
FIGS. 2a–d is a diagram explaining the conditions inside the cylinder during the combustion stroke when fuel is injected in the compression stroke.
Figure 2B:
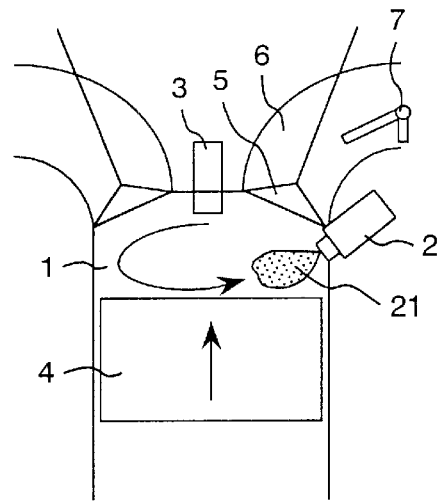

As is shown in FIG. 2a, during the intake stroke, the air intake valve 5 is open, and the piston 4 travels down with the passage of time, and the air passes through the throttle valve provided inside the air intake pipe 6 and the TCV 7, and is sucked into the combustion chamber 1. When the opening angle of TCV 7 is small, the tumble flow 20 formed inside the combustion chamber 1 becomes stronger.

Further, during the latter half of the compression stroke shown in b of the figure after the piston 4 has passed the bottom dead center, fuel is injected from the fuel injection valve 2 positioned below the air intake valve 5 based on the fuel injection pulse width calculated from the engine rotational speed and the desired torque. The injected fuel spray 21 is transported towards the spark plug 3 placed at the center of the combustion chamber by the tumble 20, that is, turbulent air flow.

Figure 2C:
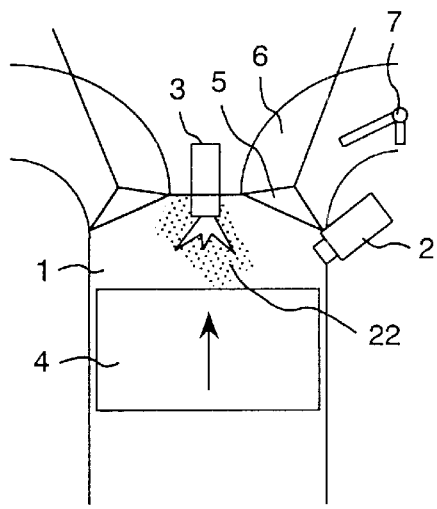

Next, as is shown in FIG. 2c, at the time of ignition, a combustible fuel-air mixture 22 would have formed in the neighborhood of the spark plug 3, and a flame kernel is formed by the spark.

Figure 2D:
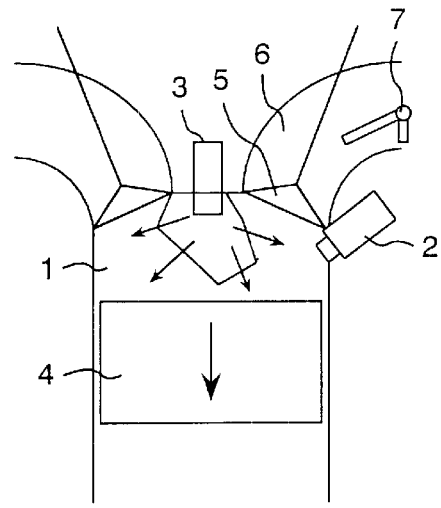

Further, as is shown in FIG. 2d, the flame spreads during the expansion stroke.

Figure 3:
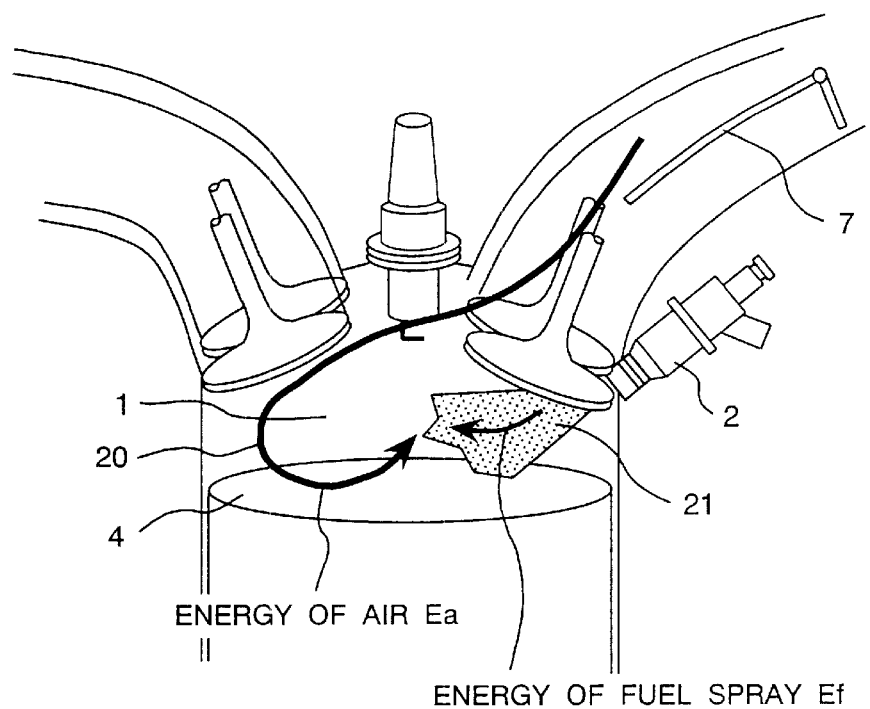
FIG. 3 is a diagram explaining the conditions inside the cylinder during the latter half of the compression stroke.

Next, the conditions inside the cylinder during the latter half of the compression stroke are described using FIG. 3.

FIG. 3 is a diagram explaining the conditions inside the cylinder during the latter half of the compression stroke.

The strength of the tumble air flow 20 formed inside the combustion chamber 1, that is the energy Ea of the air, is adjusted by the angle of opening of TCV 7. On the other hand, the injected fuel pressure supplied to the fuel injection valve 2 is being controlled according to the running conditions, and the injected fuel pressure becomes higher as the load increases. The energy Ef of the fuel spray 21 ejected from the fuel injection valve 2 is dependent largely on the injected fuel pressure. The air-fuel mixture distribution dependent on the magnitudes of the energy Ea of the air and the energy Ef of the fuel spray is described using FIG. 4 and FIG. 5.

Figure 4:
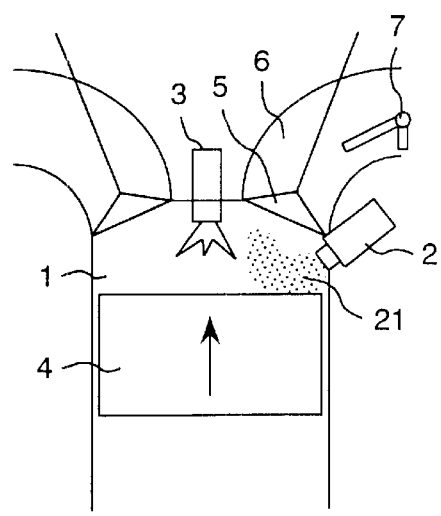
FIG. 4 is a diagram explaining the conditions of the air-fuel mixture inside the cylinder for the case when energy Ea>energy Ef.
Figure 5:
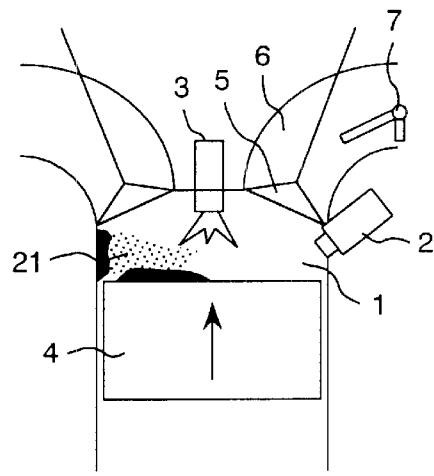
FIG. 5 is a diagram explaining the conditions of the air-fuel mixture inside the cylinder for the case when energy Ea< energy Ef.

Next, FIG. 4 and FIG. 5 are used to explain the conditions of the air-fuel mixture inside the cylinder based on the energy Ea and the energy Ef during the latter half of the compression stroke.

FIG. 4 is a diagram explaining the condition of the air-fuel mixture inside the cylinder when energy Ea>energy Ef, and FIG. 5 is a diagram explaining the condition of the air-fuel mixture inside the cylinder when energy Ea<energy Ef.

As is shown in FIG. 4, when energy Ea of the air>energy Ef of the fuel spray, since the air has greater energy, the fuel spray 21 is pressed by the air and stays on the air intake side of the combustion chamber, and consequently a combustible air-fuel mixture is not formed in the neighborhood of the spark plug and the combustion becomes unstable.

On the other hand, as is shown in FIG. 5, when energy Ea of the air<energy Ef of the fuel spray, since the fuel spray has greater energy, the fuel spray 21 reaches up to the exhaust side of the combustion chamber. As a result, since the fuel gets adhered to the surface of the piston 4 or on the side walls of the combustion chamber 1, the air-fuel mixture inside the combustion chamber 1 becomes distorted, and since a combustible air-fuel mixture is not formed in the neighborhood of the spark plug at the time of ignition, the combustion becomes unstable.

In other words, in an engine in which the fuel spray 21 is guided by the air, in order to form a combustible air-fuel mixture in the neighborhood of the spark plug at the time of ignition, it is necessary to optimize the energy Ea of the air flow and the energy Ef of the fuel spray in accordance with the operating conditions. In view of this, in the control unit 100 according to the present preferred embodiment of this invention, a combustible air-fuel mixture is formed in the neighborhood of the spark plug and good combustion is obtained by optimizing Ea and Ef.

Next, the configuration of the control unit used for configuring the control equipment of an internal combustion engine according to this preferred embodiment is described below using FIG. 6.

Figure 6:
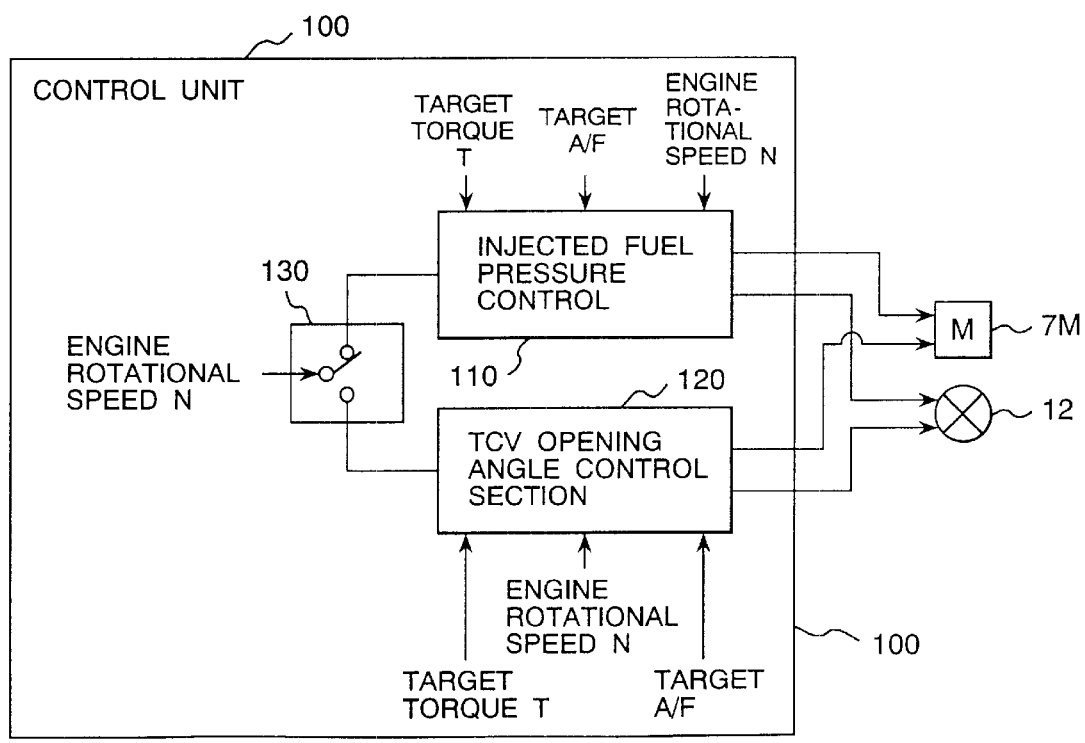
FIG. 6 is a block diagram showing the configuration of the control unit constituting the control equipment for internal combustion engines according to one preferred embodiment of this invention.

FIG. 6 is a block diagram showing the configuration of the control unit used for configuring the control equipment of an internal combustion engine according to this preferred embodiment.

The control unit 100 according to the present preferred embodiment of this invention has a injected fuel pressure control section 110 and a TCV opening angle control section 120. The injected fuel pressure control section 110 controls the motor 7M that changes the opening angle of TCV 7 and the injected fuel pressure adjustment valve 12 based on the target torque T, the rotational speed N of the engine and the target A/F, and particularly, varies the injected fuel pressure according to the rotational speed N of the engine when the opening angle of TCV 7 is fixed. Also, the TCV opening angle control section 120 controls the motor 7M that varies the opening angle of TCV 7 and the injected fuel pressure adjustment valve 12 based on the target torque T, engine rotational speed N, and the target A/F, and particularly, varies the opening angle of TCV 7 according to the engine rotational speed N when the injected fuel pressure is fixed.

The injected fuel pressure control section 110 and the TCV opening angle control section 120 are selected by the switching section 130 depending on the engine rotational speed N.

Next, the operation of the control unit used for configuring the control equipment of an internal combustion engine according to this preferred embodiment is described below using FIG. 7 and FIG. 8.

Figure 7:
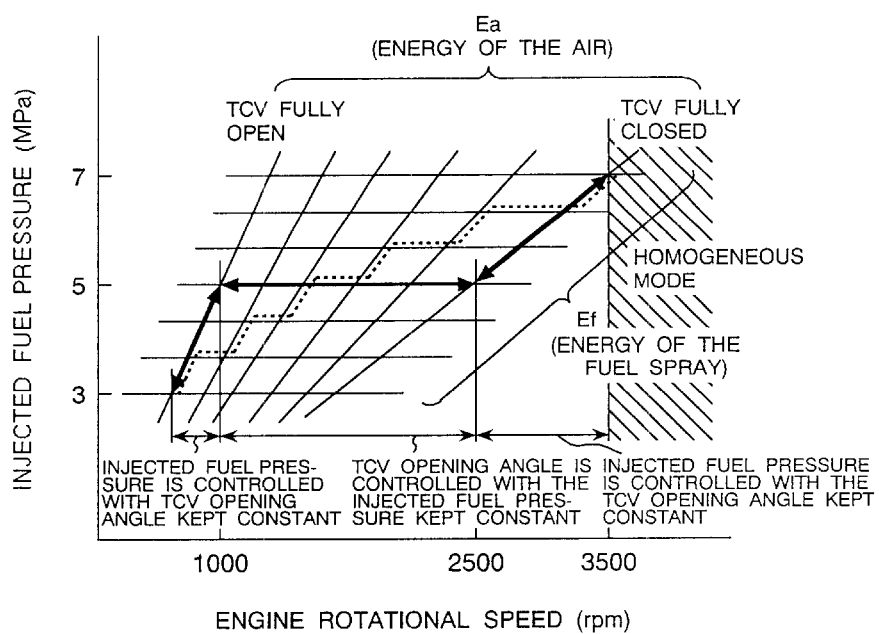
FIG. 7 is a diagram explaining the operation of the control unit constituting the control equipment for internal combustion engines according to one preferred embodiment of this invention.

FIG. 7 and FIG. 8 are diagrams explaining the operation of the control unit used for configuring the control equipment of an internal combustion engine according to this preferred embodiment. Here, FIG. 7 shows the control concepts of the injected fuel pressure and TCV opening angle control by the control unit, and FIG. 8 shows examples of injected fuel pressure and TCV opening angle control.

As is shown in FIG. 7, the control unit according to this preferred embodiment of the invention controls the injected fuel pressure while maintaining the TCV opening angle constant in the low rotational speed region of the engine up to 1000 rpm and in the medium rotational speed region of 2500 rpm to 3500 rpm, and controls the TCV opening angle while maintaining constant the injected fuel pressure in the engine rotation speed region of 1000 rpm to 2500 rpm.

In other words, at rotational speeds below 1000 rpm and in the range 2500 rpm to 3500 rpm, when the TCV opening angle is maintained constant, since the strength of the tumble air flow (the energy Ea of the air) increases as the engine rotational speed N increases, by varying the energy Ef of the fuel spray in accordance with the increase in the strength of the tumble air flow, the values of Ea and Ef are optimized.

Further, in the rotational speed region of 1000 rpm to 2500 rpm, the energy Ef of the fuel spray is maintained constant, and the strength of the tumble air flow increases as the engine rotational speed N increases, but by making larger the TCV opening angle, the energy Ea of the air is maintained almost constant thereby optimizing Ea and Ef.

Here, concrete examples of injected fuel pressure and TCV opening angle control are explained using FIGS. 7a and b.

Figure 8A:
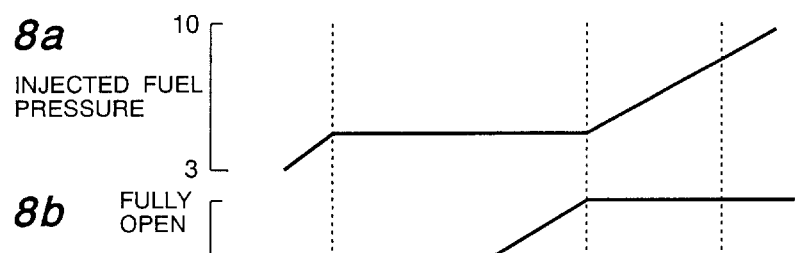
FIGS. 8a–b is a diagram explaining the operation of the control unit constituting the control equipment for internal combustion engines according to one preferred embodiment of this invention.
Figure 8B:
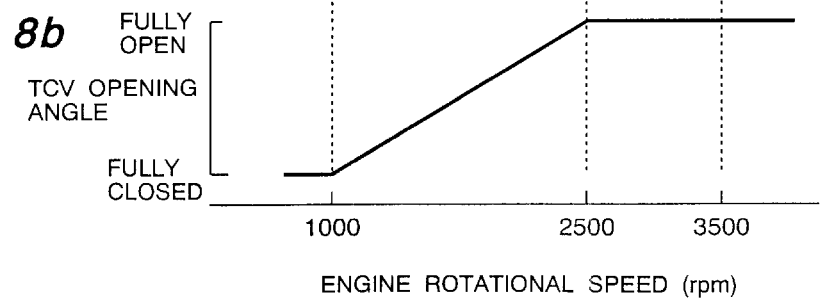

As is shown in FIG. 8a, the injected fuel pressure increases in proportion to get the engine rotational speed from 3 Mpa to 5 Mpa from the idling rotational speed up to 1000 rpm. At this time, the TCV opening angle is maintained fully closed as is shown in FIG. 8b.

Further, in the region 1000 rpm to 2500 rpm of the engine rotational speed N, the injected fuel pressure is maintained constant at 5 Mpa as is shown in FIG. 7a, and the TCV opening angle is varied according to the engine rotational speed from fully closed to fully open.

In addition, at engine rotational speeds N of more than 2500 rpm, as is shown in FIG. 8a, the injected fuel pressure is increased from 5 Mpa in proportion to the engine rotational speed. At this time, the TCV opening angle is kept fully open as is shown in FIG. 8b.

It is possible to make the control block simple by determining the control method depending on the range of rotational speed in this manner. Also, in the high rotational speed region of more than 3500 rpm, the TCV will be fully open and the engine will be running in the homogeneous charge mode of injection during the intake stroke.

Next, the configuration of the injected fuel pressure control section 110 according to this preferred embodiment of the invention is described below using FIGS. 9 to 11.

Figure 9:
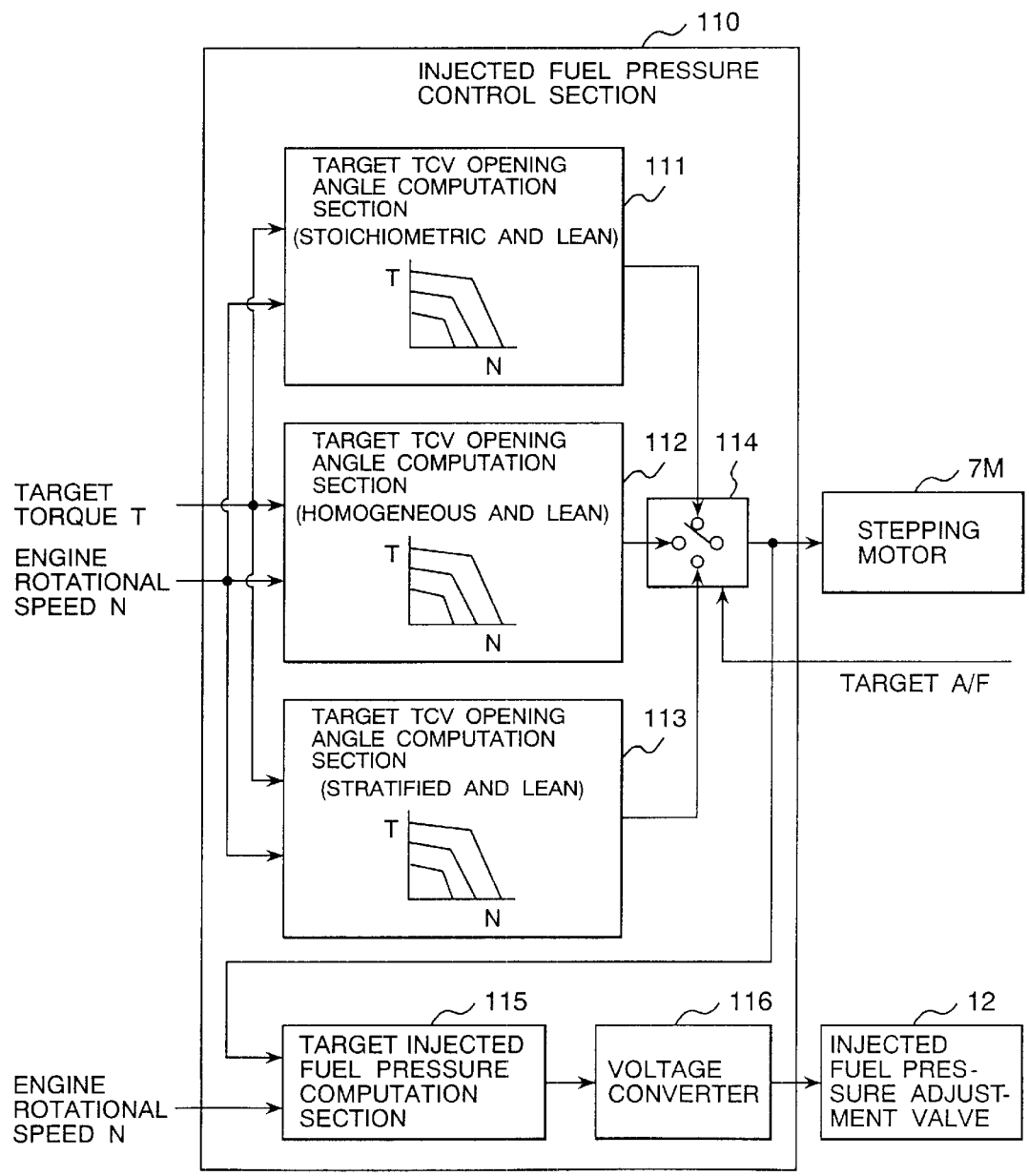
FIG. 9 is a block diagram showing the configuration of the injected fuel pressure control section according to one preferred embodiment of this invention.
Figure 10:
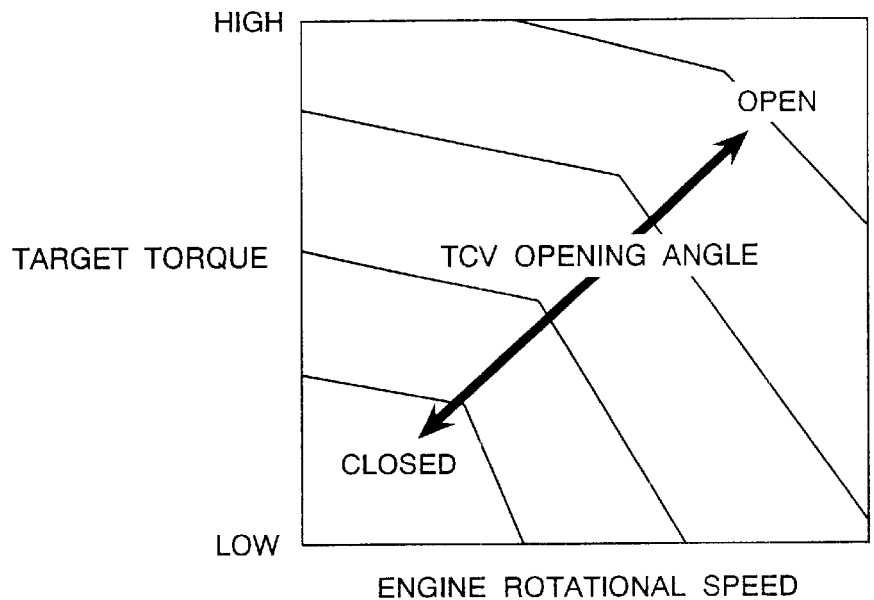
FIG. 10 is a graph showing an example of the map used in the target TCV opening angle computation section of the injected fuel pressure control section according to one preferred embodiment of this invention.
Figure 11:
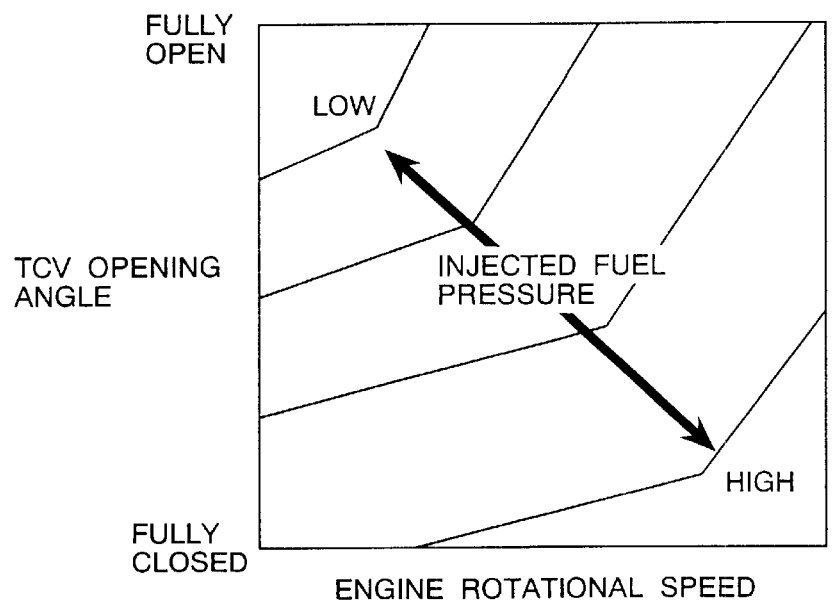
FIG. 11 is a graph showing an example of the map used in the target injected fuel pressure computation section of the injected fuel pressure control section according to one preferred embodiment of this invention.

FIG. 9 is a block diagram showing the configuration of the combustion control section according to one preferred embodiment of the present invention, FIG. 10 is a diagram showing an example of the map used in the target TCV opening angle computation section, and FIG. 11 is a diagram showing an example of the map used in the target injected fuel pressure computation section.

As is shown in FIG. 9, the injected fuel pressure control section 110 comprises a target TCV opening angle computation section (stoichiometric amount of air) 111, a target TCV opening angle computation section (homogeneous and lean charge) 112, a target TCV opening angle computation section (stratified and lean charge) 113, a switching section 114, a target injected fuel pressure computation section 115, and a voltage converter section 116.

The target TCV opening angle computation section (stoichiometric amount of air) 111, the target TCV opening angle computation section (homogeneous and lean charge) 112, and the target TCV opening angle computation section (stratified and lean charge) 113, the target torque and the engine rotational speed N are input, and there is a target TCV opening angle map that outputs the target TCV opening angle corresponding to the target 112, and the target TCV opening angle computation section torque T and the engine rotational speed N. Further, it is possible to obtain the target torque T from the engine rotational speed N and the throttle opening angle Tθ. The target TCV opening angle map is divided into the three parts of stoichiometric, homogeneous and lean charge, and stratified and lean charge, and the target opening angle of TCV is selected by the switching section 114 in response to the target A/F. The target A/F is obtained by the rotational speed N and the target torque T.

As is shown in FIG. 10, the target TCV opening angle map is one in which the TCV opening angle is large when the engine rotational speed N is small and the target torque T is also small, and the TCV opening angle becomes smaller when the engine rotational speed N is large and the target torque T is high.

The selected target TCV opening angle is output as the TCV control signal to the motor 7M that changes the opening angle of TCV 7, and is also output to target injected fuel pressure computation section 115.

The target injected fuel pressure computation section 115, refers to the target injected fuel pressure map based on the selected target TCV opening angle and the engine rotational speed N and obtains the target injected fuel pressure. As is shown in FIG. 11, the target injected fuel pressure map is one in which the target injected fuel pressure is low when the engine rotational speed N is small and the TCV opening angle is large, and the injected fuel pressure becomes higher when the engine rotational speed N is higher and the TCV opening angle is small.

The voltage converter section 116 converts the target injected fuel pressure obtained from the target injected fuel pressure computation section 115 into a voltage signal and supplies it to the injected fuel pressure adjustment valve 12 thereby controlling the injected fuel pressure.

Next, the configuration of the TCV opening angle control section 120 according to the present preferred embodiment of this invention is described below using FIGS. 12 to 14.

Figure 12:
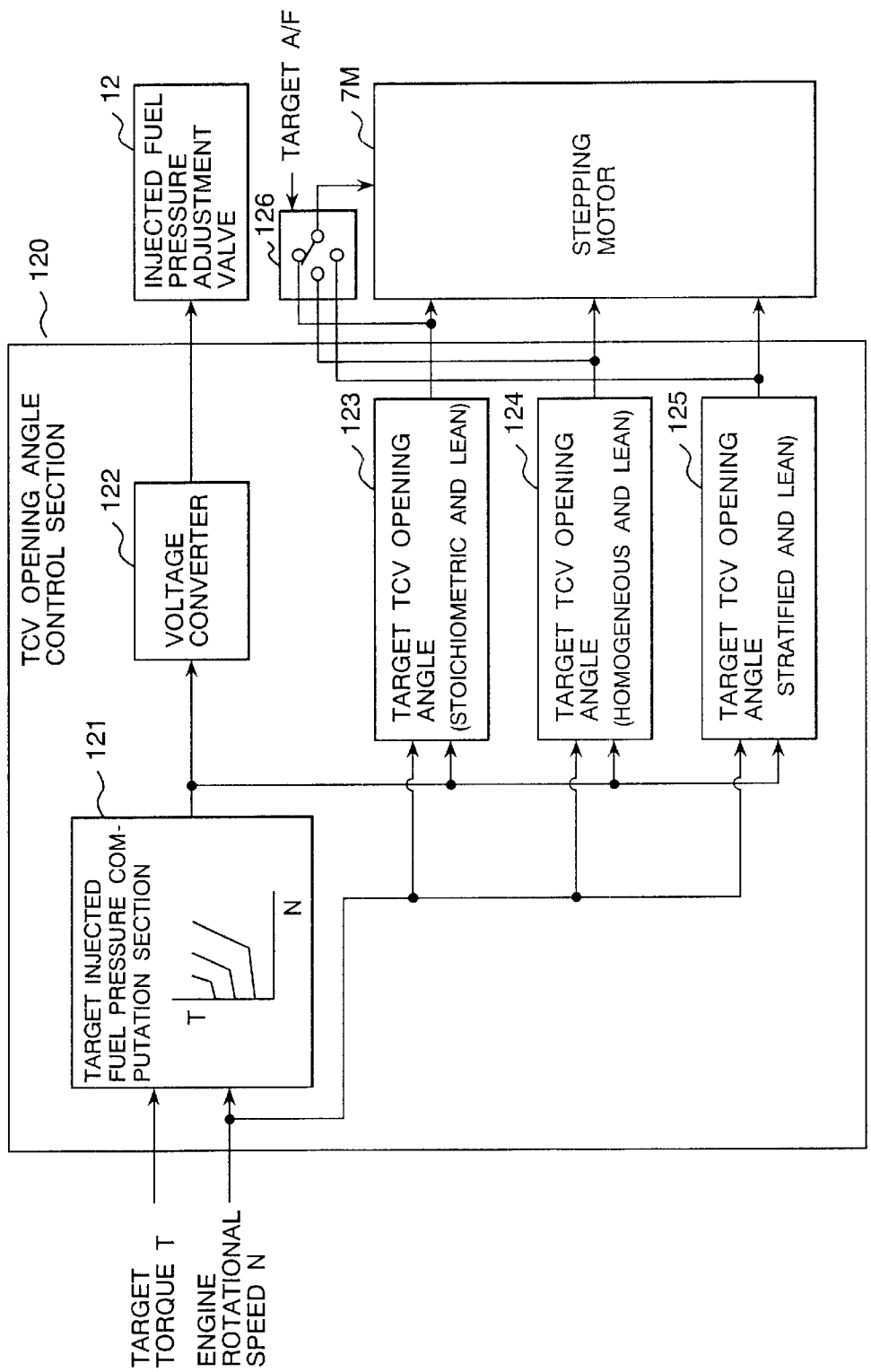
FIG. 12 is a block diagram showing the configuration of the TCV opening angle control section according to one preferred embodiment of this invention.
Figure 13:
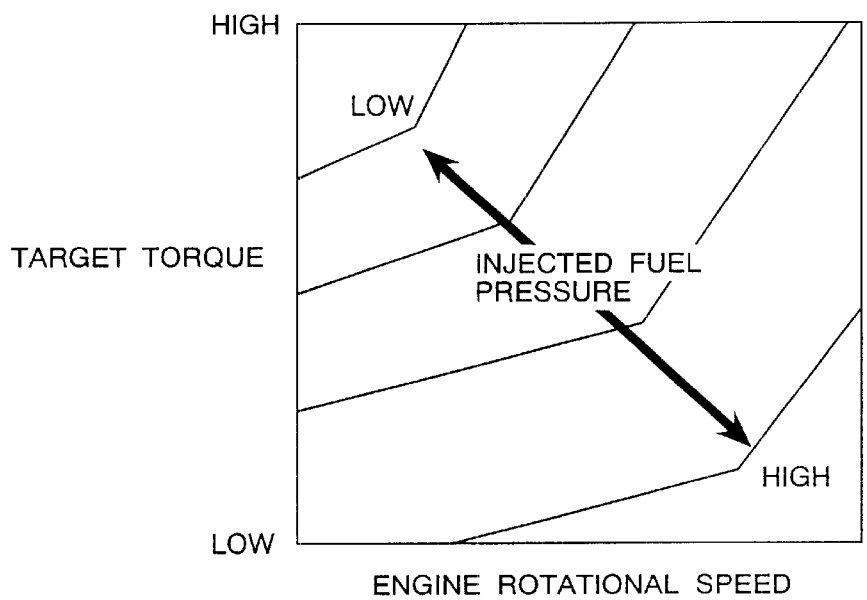
FIG. 13 is a graph showing an example of the map used in the target injected fuel pressure computation section of the TCV opening angle control section according to one preferred embodiment of this invention.

As is shown in FIG. 12, the TCV opening angle control section 120 comprises an injected fuel pressure computation section 121, a voltage converter section 122, a target TCV opening angle computation section (stoichiometric amount of air) 123, a target TCV opening angle computation section (homogeneous and lean charge) 124, a target TCV opening angle computation section (stratified and lean charge) 125, and a switching section 114.

The target injected fuel pressure computation section 121 refers to the target injected fuel pressure map based on the selected target torque T and the engine rotational speed N and obtains the target injected fuel pressure. Further, it is possible to obtain the target torque T from the engine rotational speed N and the throttle opening angle Tθ. As is shown in FIG. 13, the target injected fuel pressure map is one in which the target injected fuel pressure is low when the engine rotational speed N is small and the TCV opening angle is large, and the injected fuel pressure becomes higher when the engine rotational speed N is higher and the TCV opening angle is small.

The voltage converter section 122 converts the target injected fuel pressure obtained from the target injected fuel pressure computation section 121 into a voltage signal and supplies it to the injected fuel pressure adjustment valve 12 thereby controlling the injected fuel pressure.

In the target TCV opening angle computation section (stoichiometric amount of air) 123, the target TCV opening angle computation section (homogeneous and lean charge) 124, and the target TCV opening angle computation section (stratified and lean charge) 125, the target injected fuel pressure and the engine rotational speed N are input, and there is a target TCV opening angle map that outputs the target TCV opening angle corresponding to the target injected fuel pressure A/F and the engine rotational speed N. The target TCV opening angle map is divided into the three parts of stoichiometric, homogeneous and lean charge, and stratified and lean charge, and the target opening angle of TCV is selected by the switching section 126 in accordance with the target A/F. Further, it is possible to obtain the target A/F from the engine rotational speed N and the torque T.

Figure 14:
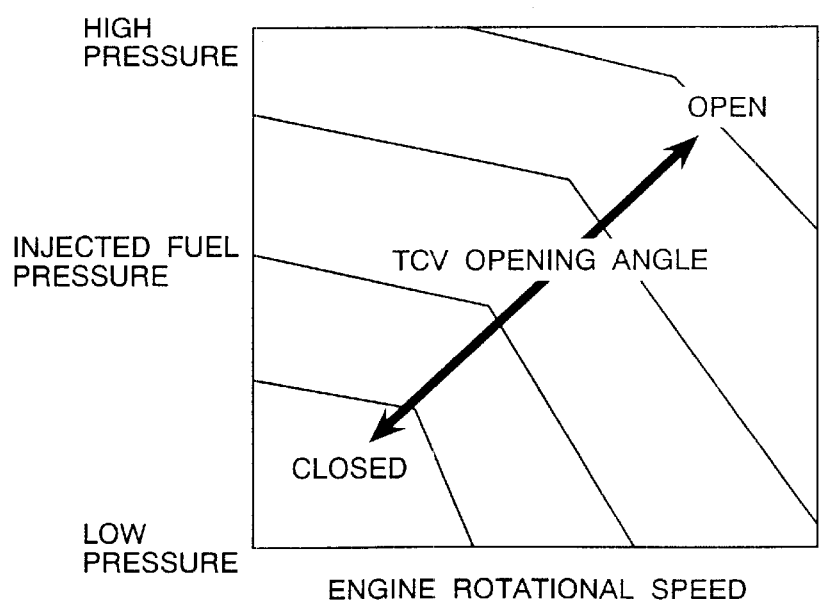
FIG. 14 is a graph showing an example of the map used in the target TCV opening angle computation section of the TCV opening angle control section according to one preferred embodiment of this invention.

As is shown in FIG. 14, the target TCV opening angle map is one in which the TCV opening angle is large when the engine rotational speed N is small and the target injected fuel pressure is also small, and the TCV opening angle becomes smaller when the engine rotational speed N is large and the target injected fuel pressure is high.

The selected target TCV opening angle is output as the TCV control signal to the motor 7M that changes the opening angle of TCV 7.

Further, in the above example, the engine rotational speed N is divided into three stages of less than 1000 rpm, 1000 rpm to 2500 rpm, and more than 2500 rpm, and the switching between the injected fuel pressure control section and the TCV opening angle control section is made for each of these stages. However, in the region of engine rotational speeds or less than 3500 rpm, it is also possible to make further division into several additional stages as is shown in the broken line in FIG. 7 and to switch between the injected fuel pressure control section and the TCV opening angle control section.

In addition, the control range of injected fuel pressure and TCV opening angle change depending on the TCV flow path area.

As has been described so far, according to the present preferred embodiment of this invention, since switching is made depending on the rotational speed of the engine between the injected fuel pressure controls section that controls the injected fuel pressure while maintaining constant the TCV opening angle and the TCV opening angle control section that controls the TCV opening angle while maintaining constant the injected fuel pressure, in a fuel injection type internal combustion engine using a flat shaped piston, it becomes possible to form a combustible air-fuel mixture in the neighborhood of the spark plug at the time of ignition, thereby aiming not only to make the exhaust gas cleaner but also to obtain stable combustion.

Next, the control equipment of an internal combustion engine according to the second preferred embodiment of the present invention is described below using FIG. 15 and FIG. 16. Further, the overall configuration of the fuel injection system using a control equipment for internal combustion engines according to the present preferred embodiment of this invention is similar to that shown in FIG. 1, and the configuration of the control unit constituting the control equipment of internal combustion engines according to the present preferred embodiment of the invention is one having a injected fuel pressure control section 110 and a TCV opening angle control section 120, as is shown in FIG. 6.

Figure 15:
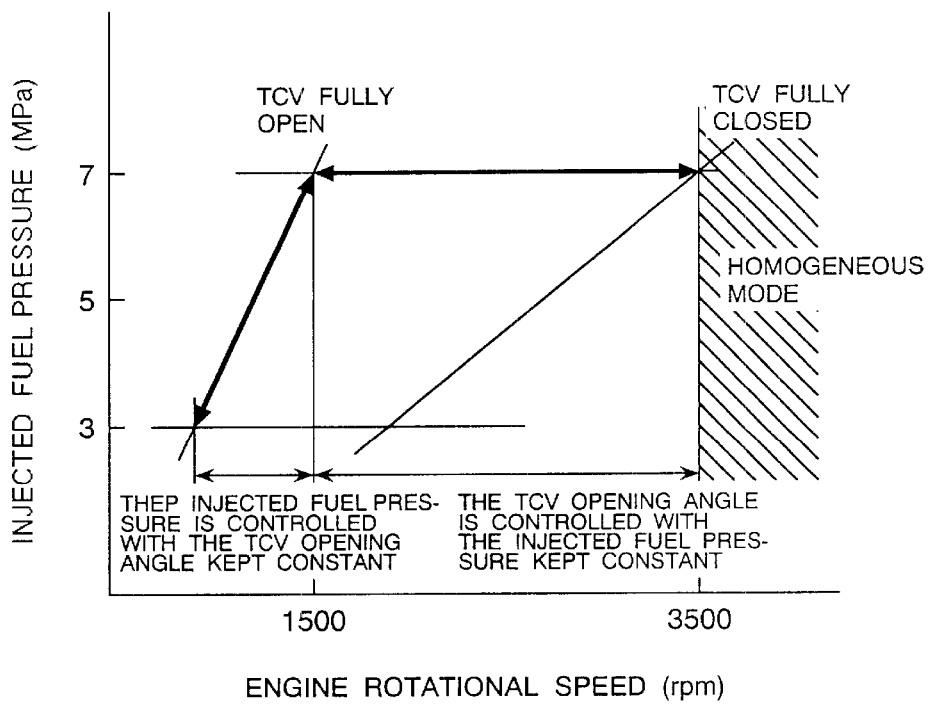
FIG. 15 is a diagram explaining the operation of the control unit constituting the control equipment for internal combustion engines according to the second preferred embodiment of this invention.

FIG. 15 and FIG. 16 are diagrams explaining the operation of the control unit constituting the control equipment of internal combustion engines according to the present preferred embodiment of the invention. Here, FIG. 15 shows the control concepts of the control of the injected fuel pressure and the TCV opening angle by the control unit, and FIG. 16 shows an example of control of the injected fuel pressure and TCV opening angle.

As is shown in FIG. 15, the control unit 100 in the present preferred embodiment of this invention controls the injected fuel pressure while maintaining the TCV opening angle constant in the low engine rotational speed region of up to 1500 rpm, and controls the TCV opening angle while maintaining constant the injected fuel pressure in the rotational speed region of 1500 rpm to 3500 rpm.

In other words, in the rotational speed region of less than 1500 rpm, because of keeping the TCV opening angle fixed, since the strength of the tumble air movement (the energy Ea of the air) increases as the engine rotational speed N increases, the values of Ea and Ef are optimized by varying the energy Ef of the fuel spray in accordance with the increase in this strength of the tumble air flow.

In addition, in the rotational speed region of 1500 rpm to 3500 rpm, the energy Ef of the fuel spray is maintained constant and while the strength of the tumble air flow increases as the engine rotational speed N increases, the values of Ea and Ef are optimized at this time by increasing the TCV opening angle so that the energy Ea of the air is maintained almost constant.

Figure 16A:
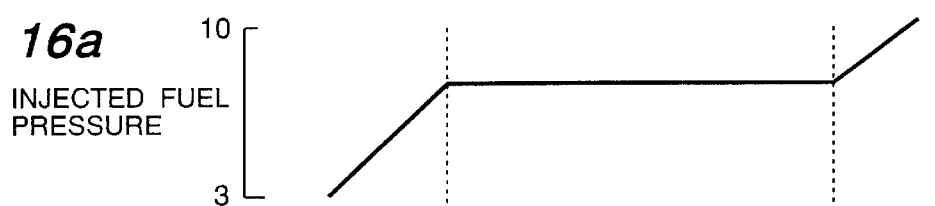
FIGS. 16a–b is a diagram explaining the operation of the control unit constituting the control equipment for internal combustion engines according to the second preferred embodiment of this invention.

Next, as is shown in FIG. 16a, from the idling rotational speed up to 1500 rpm, the injected fuel pressure is increased from 3 Mpa to 7 Mpa proportionally in accordance with the engine rotational speed. During this operation, the TCV opening angle is maintained in the fully open condition as is shown in FIG. 16b.

Figure 16B:
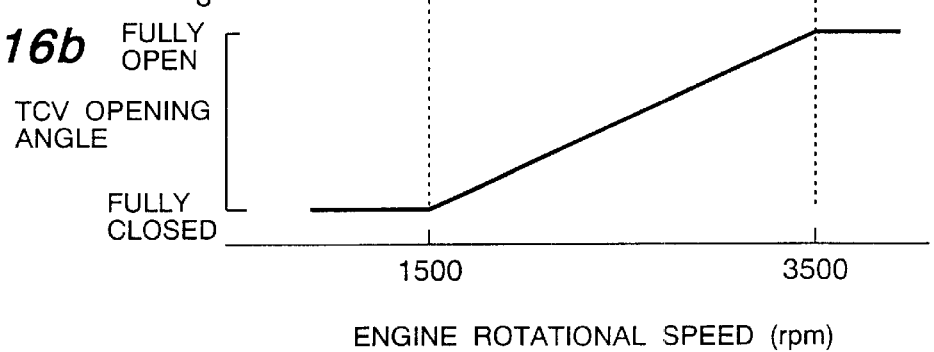

Further, in the rotational speed region from 1500 rpm to 3500 rpm, as is shown in FIG. 16a, the injected fuel pressure is maintained constant at 7 Mpa, and, as is shown in FIG. 16b, the TCV opening angle is varied from fully closed to fully open in accordance with the engine rotational speed.

In this manner, it is possible to make the control logic simpler by determining the control method depending on the rotational speed region. In addition, in the high rotational speed region of more than 3500 rpm, the TCV will be fully open and the engine operates in the homogeneous mode of fuel injection during the intake stroke.

Further, in this method, the region of operation at high injected fuel pressures is wide, and the conversion to finer particles in the fuel spray is promoted thereby having the effect of improving the exhaust gas.

Next, the control equipment of an internal combustion engine according to the third preferred embodiment of the present invention is described below using FIG. 17 and FIG. 18. Further, the overall configuration of the fuel injection system using a control equipment for internal combustion engines according to the present preferred embodiment of this invention is similar to that shown in FIG. 1, and the configuration of the control unit constituting the control equipment of internal combustion engines according to the present preferred embodiment of the invention is one having a injected fuel pressure control section 110 and a TCV opening angle control section 120, as is shown in FIG. 6.

FIG. 17 and FIG. 18 are diagrams explaining the operation of the control unit constituting the control equipment of internal combustion engines according to the present preferred embodiment of the invention. Here, FIG. 17 shows the control concepts of the control of the injected fuel pressure and the TCV opening angle by the control unit, and FIG. 18 shows an example of control of the injected fuel pressure and TCV opening angle.

As is shown in FIG. 18, the control unit 100 in the present preferred embodiment of this invention controls the TCV opening angle while maintaining the injected fuel pressure constant in the low engine rotational speed region of up to 1500 rpm, and controls the injected fuel pressure while maintaining constant the TCV opening angle in the rotational speed region of 1500 rpm to 3500 rpm.

In other words, in the rotational speed region of less than 1500 rpm, because of keeping fixed the energy Ef of the fuel spray, since the strength of the tumble air movement (the energy Ea of the air) increases as the engine rotational speed N increases, the values of Ea and Ef are optimized by increasing the TCV opening angle at this time thereby maintaining the energy Ea of air almost constant.

In addition, in the rotational speed region of 1500 rpm to 3500 rpm, because the TCV opening angle is kept, the strength of the tumble air flow (the energy Ea of the air) increases as the engine rotational speed N increases, and the values of Ea and Ef are optimized at this time by varying the energy Ef of the fuel spray in accordance with the increase in the strength of the tumble air flow.

Here, as is shown in FIG. 18a, in the range of engine rotational speed from the idling speed up to 1500 rpm, the injected fuel pressure is maintained constant at 3 Mpa, and, as is shown in FIG. 18b, the TCV opening angle is varied from fully closed to fully open in accordance with the engine rotational speed.

Additionally, in the range of engine rotational speed N from 1500 rpm to 3500 rpm, the injected fuel pressure is increased proportionally from 3 Mpa to 10 Mpa. At this time, the TCV opening angle is maintained in the fully open condition as is shown in FIG. 18b.

In this manner, it is possible to make the control logic simpler by determining the control method depending on the rotational speed region. In addition, in the high rotational speed region of more than 3500 rpm, the TCV will be fully open and the engine operates in the homogeneous mode of fuel injection during the intake stroke.

Further, in this method, in the low engine rotational speed region of up to 2000 rpm, because the injected fuel pressure is low, the energy supplied to the fuel pump becomes small and hence it will be possible to improve the fuel consumption performance.

Furthermore, in the case of two fuel injections, once each during the intake stroke and the compression stroke, by carrying out the first fuel injection during the intake stroke, a preliminary air-fuel mixture is formed, and the second fuel injection for ignition is made during the latter half of the compression stroke. In such a case, it is also preferable to carry out compensation for the injected fuel pressure determined by the target injected fuel pressure map, as is shown in FIG. 9 and FIG. 12, using the pulse width of fuel injection carried out during the compression stroke.

As a consequence, as one form of preferred embodiment of the present invention, the injected fuel pressure is corrected by the injection pulse width during the compression stroke during the second injection.

According to the present invention, in a fuel injection internal combustion engine, it is possible to make the exhaust gas cleaner and also to obtain stable combustion.

What is claimed is:

1. A control equipment for internal combustion engines comprising:
   an injector directly to inject fuel into the cylinder;
   an air motion control valve to adjust the intensity of tumble air movement inside the cylinder; and
   a controller configured to determine the opening angle of said air motion control valve based on the rotational speed of the engine and the target torque, and configured to determine the pressure of injected fuel in relation to the opening angle of said air motion control valve based on the rotational speed of the engine.

2. A control equipment for internal combustion engines according to claim 1, wherein the piston positioned inside the cylinder is one whose top part has a flat shape.

3. A control equipment for internal combustion engines according to claim 1, wherein the piston positioned inside the cylinder is one whose top part has a flat shape.

4. A control equipment for internal combustion engines according to claim 1, wherein said controller includes a fuel pressure control section that varies the pressure of injected fuel based on the rotational speed of the engine while maintaining the angle of opening of said air motion control valve constant, and a tumble control valve (TCV) opening angle control section that varies said angle of opening of said air motion control valve based on the rotational speed of the engine while maintaining said pressure of injected fuel constant, and the control is carried out by switching between the fuel pressure control section and the TCV opening angle control section based on the rotational speed of the engine.

5. A control equipment for internal combustion engines comprising:

an injector directly to inject fuel into the cylinder;

an air motion control valve to adjust the intensity of tumble air movement inside the cylinder; and a controller configured to determine the pressure of injected fuel based on the rotational speed of the engine and the target torque, and configured to determine the opening angle of said air motion control valve in relation to the pressure of injected fuel based on the rotational speed of the engine.

* * * * *